United States Patent [19]
Bastin et al.

[11] Patent Number: 6,036,206
[45] Date of Patent: Mar. 14, 2000

[54] TRACTION CONTROL AND ACTIVE SUSPENSION

[75] Inventors: Bruce G. Bastin, Starbuck; Kevin C. Lent, Glenwood, both of Minn.

[73] Assignee: Case Corporation, Racine, Wis.

[21] Appl. No.: 08/969,798

[22] Filed: Nov. 13, 1997

[51] Int. Cl.[7] .................................................. B60G 21/00
[52] U.S. Cl. .............................. 280/124.1; 280/124.162; 280/5.514
[58] Field of Search ............................. 280/5.514, 124.1, 280/121.103, 124.106, 124.107, 124.162

[56] References Cited

U.S. PATENT DOCUMENTS

| | | | |
|---|---|---|---|
| 3,853,198 | 12/1974 | Boettger et al. | 180/41 |
| 3,898,807 | 8/1975 | Habiger | 60/391 |
| 3,943,717 | 3/1976 | Schexnayder | 60/453 |
| 4,270,771 | 6/1981 | Fuji | 280/707 |
| 4,801,218 | 1/1989 | Musil | 404/84 |
| 4,913,457 | 4/1990 | Hafer et al. | 280/707 |
| 4,930,807 | 6/1990 | Lachaize | 280/707 |
| 4,977,732 | 12/1990 | Minter | 56/11.4 |
| 5,033,573 | 7/1991 | Hrovat | 180/197 |
| 5,362,094 | 11/1994 | Jensen | 280/689 |
| 5,566,970 | 10/1996 | Lin | 280/689 |
| 5,785,344 | 7/1998 | Vandewal et al. | 280/714 |
| 5,899,472 | 5/1999 | Burke et al. | 280/124.106 |

FOREIGN PATENT DOCUMENTS 0 226 844 A1   7/1987   European Pat. Off. .

OTHER PUBLICATIONS

International Search Report from PCT/US98/24190 mailed Apr. 20, 1999.

*Primary Examiner*—Mark T. Le
*Assistant Examiner*—Daniel Yeagley
*Attorney, Agent, or Firm*—Faegre & Benson LLP

[57] ABSTRACT

A traction control and active suspension for land vehicles of the type having ground-engaging wheels and a fluid motor for each wheel, located on a wheel mount movable with respect to a vehicle frame, wherein a suspension spring and fluid cylinder are interposed between the wheel mount and the frame, and fluid pressure applied to the wheel motor is also applied to the cylinder such that when traction is lost, the fluid pressure drops in the cylinder, allowing the spring to extend the wheel mount towards the ground to regain traction. A fluid valve is provided to flush the fluid cylinder when the vehicle transmission is in a neutral condition in one embodiment, while an alternative embodiment uses a pair of diverter valves to accomplish flushing of the fluid cylinders.

17 Claims, 5 Drawing Sheets

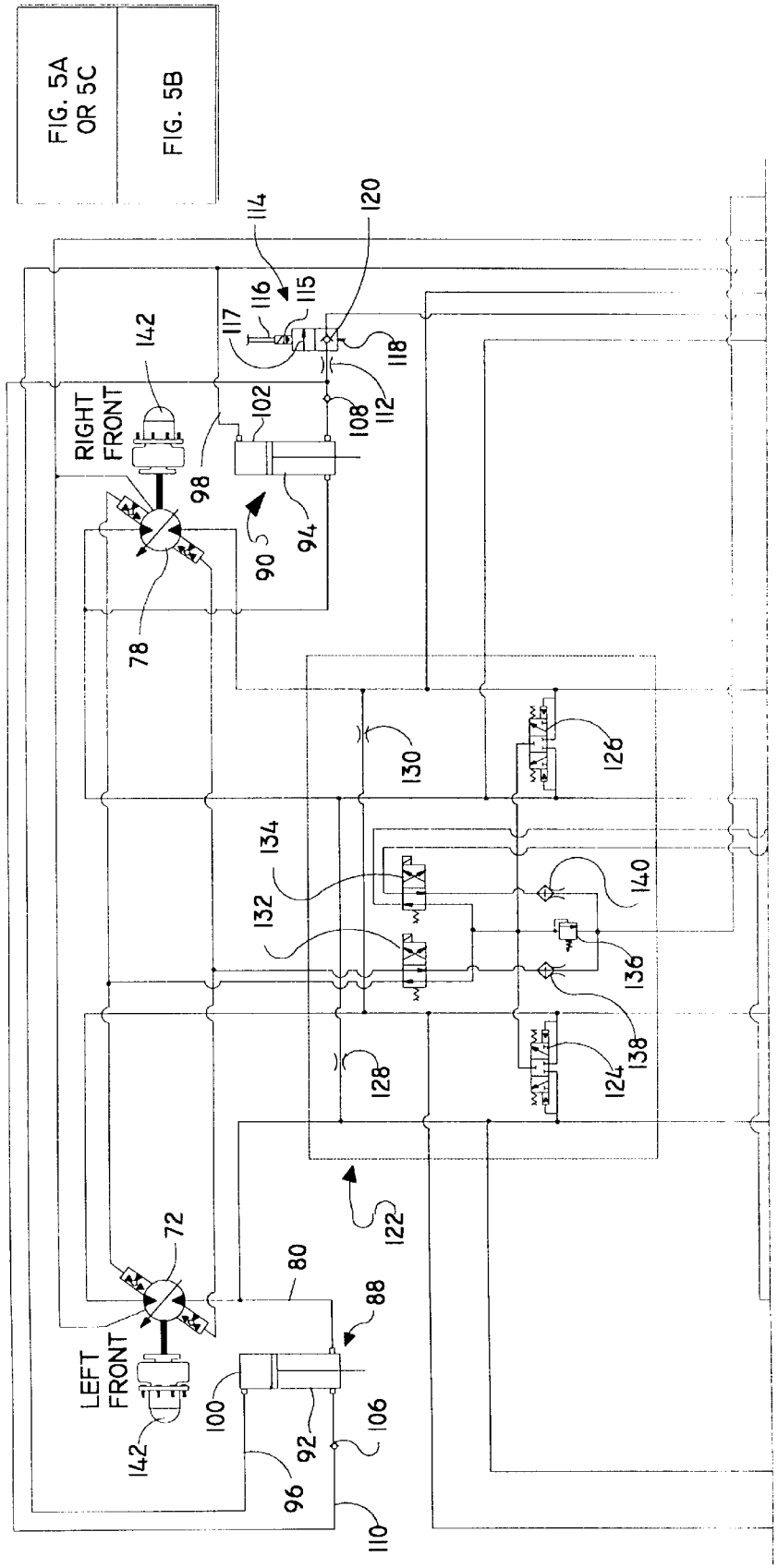

TRACTION CONTROL AND ACTIVE SUSPENSION

FIELD OF THE INVENTION

This invention relates to the field of off-road land vehicles, particularly, to wheeled construction and agricultural vehicles powered by hydraulic wheel motors.

BACKGROUND OF THE INVENTION

In the past, it was found that front wheel hop and loss of traction occurred during various conditions of operation of mobile, land-based equipment using hydraulic wheel motors with trailing arm suspensions. Such undesired wheel lift adversely affected the ability of such equipment to climb hills and negotiate uneven terrain. The present invention overcomes the undesirable wheel lift by utilizing a hydraulic cylinder in place of (or in addition to) a conventional shock absorber in the front wheel suspension assembly. The present invention is a form of active suspension that is most useful in improving traction by shifting weight to the spinning wheel.

BRIEF DESCRIPTION OF THE DRAWINGS

FIG. 5 is a key for FIGS. 5a and 5b.

FIG. 5A is a first portion of a detailed hydraulic schematic of the hydraulic circuit of FIG. 3.

DETAILED DESCRIPTION

Figure 1:
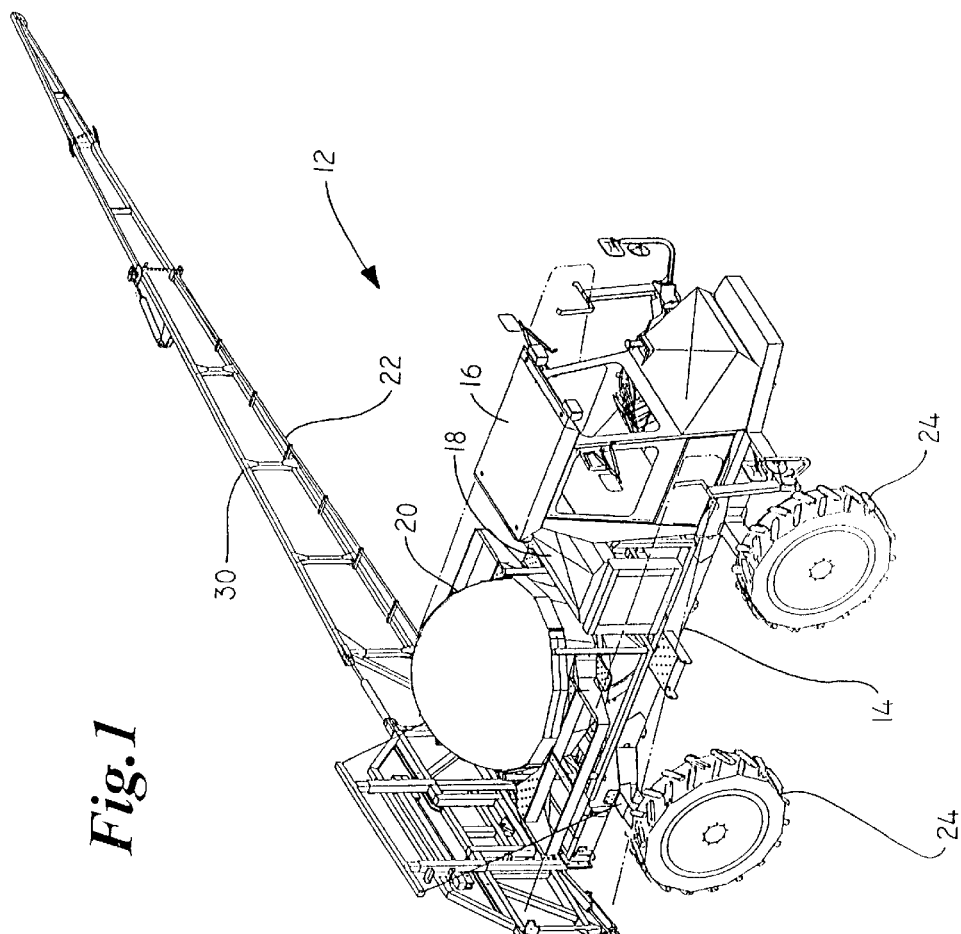
FIG. 1 is a perspective view of a mobile agricultural sprayer useful in the practice of the present invention.

Referring now to the Figures, and most particularly to FIG. 1, a vehicle (more particularly a sprayer) 12 useful in the practice of the present invention may be seen. Sprayer 12 is intended for applying liquid chemicals to agricultural crops by using one or two booms 28, 30, each of which may be extended perpendicularly to the vehicle for spraying and each of which are retractable to a condition parallel to the vehicle for transport. Sprayer 12 preferably has a frame 14 carrying an operator's cab 16, a diesel engine and hydrostatic transmission 18 having a neutral condition, and forward and reverse drive conditions. Sprayer 12 also preferably has a tank 20 for carrying the chemicals to be applied via chemical delivery conduits and nozzles 22. Sprayer 12 also preferably has four ground engagement wheels 24, each driven by a hydrostatic or other fluid-operated motor. It is to be understood that vehicle 12 has two wheels 24 (as shown in FIG. 1) on the right hand side of the vehicle, and similarly also has two wheels (not shown) on the left hand side of vehicle 12. Each of the front pair of wheels is preferably steerable, while the rear pair of wheels need not be.

Figure 2:
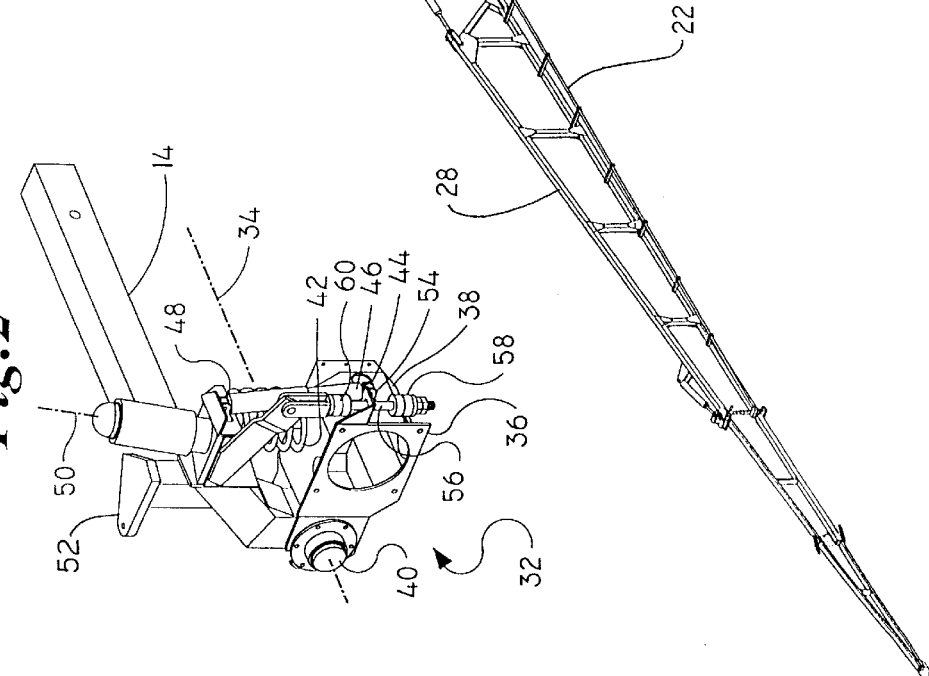
FIG. 2 is a perspective view of a trailing arm suspension of the agricultural sprayer of FIG. 1.
Figure 3:
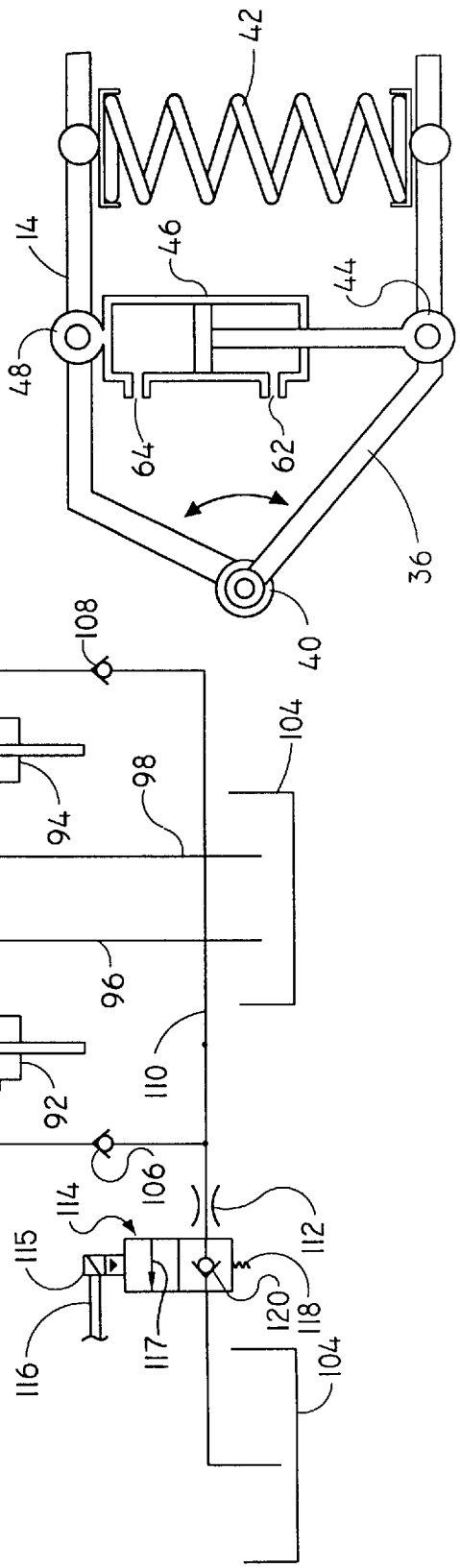
FIG. 3 is a schematic view of the trailing arm suspension of FIG. 2.

Referring now also to FIG. 2, each wheel (and its associated motor) is supported on the frame 14 by a wheel mount 32 such that the wheel mount 32 is movable with respect to the frame 14 via a pivot 40. As used in this description of FIG. 2, the wheel mount 32 refers to unsprung components and the frame 14 refers to sprung components, whether the assembly is steerable or not. As shown in FIG. 2, (which shows a front wheel suspension arrangement) wheel mount 32 pivots about axis 34. A wheel motor mounting plate or support 36 has an extension 38 supporting a first end of a suspension member or spring 42, with the other end of the spring 42 supported by frame 14. In addition, for reasons explained infra, extension 38 also supports a first end 44 of a fluid (preferably hydraulic) cylinder or actuator 46, which may be a model AU-0233 available from Prince Manufacturing Corporation, at P.O. Box 537, Sioux City, Iowa 51102. A second end 48 of cylinder 46 is supported by frame 14. In FIG. 2 it is to be understood that the wheel mount 32 is rotatable about axis 50 to provide steerability. It is to be further understood that the wheel mounts for the rear wheels, may, but preferably do not, have such rotatability for steerability. In the assembly shown, a bell crank arm 52 may be used to control the angle of rotation about axis 50. A flange 54 is secured to plate 36 and is positioned around a rod 56 and is free to move therealong within predetermined limits of an operating range, the limits set by end stops 58, 60. The end stop 60 limits upward travel of the wheel mount 32 and is secured to frame 14. As shown, the suspension arrangement of FIG. 2 is in a "normal" condition with the motor mount located intermediate the limits of its operating range. Referring now also to FIG. 3, the schematic view of the suspension assembly shows that cylinder 46 is a double acting type, with the piston rod end chamber connection or port 62 connected to a source of fluid pressure, while the piston head end chamber connection or port 64 may be fluidly coupled to a tank or reservoir 104, or vented to atmosphere or to the opposite side of the respective propulsion motor. For example, if port 62 is connected to line 80, port 64 may be connected to line 96 or vented to atmosphere, or connected to line 84. When pressure is applied to cylinder 46 via connection or port 62, the piston will move toward the frame, acting against spring 42. FIGS. 2 and 3 are illustrative of a "normal" or conventional operating condition of the suspension. When pressure is relieved at port 62, spring 42 will force the wheel mount 32 away from the frame 14.

Figure 4:
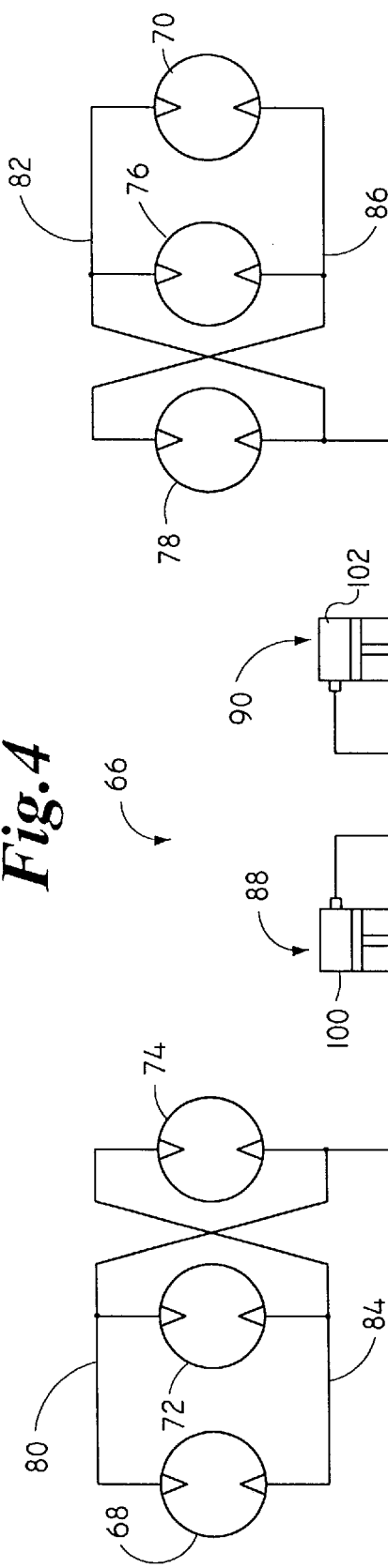
FIG. 4 is a simplified hydraulic schematic of a hydraulic circuit useful in the practice of the present invention.

Referring now also to FIG. 4, a simplified hydraulic circuit 66 of the present invention may be seen. Circuit 66 includes a pair of fluid pumps (more particularly, hydraulic pumps, and most particularly hydrostatic pumps) 68, 70, each connected to respective pairs of fluid, (hydraulic, hydrostatic) wheel motors 72, 74, 76, 78. Motor 72 is preferably in a left front position on the vehicle, while motor 74 is preferably in a right rear position. Similarly, motors 76 and 78 are, respectively, in the right front and left rear positions on the vehicle. It can thus be seen that each of pumps 68, 70 powers diagonally opposite wheels on the vehicle. Lines 80, 82 are FORWARD direction hydraulic lines in that fluid will flow from the pump to the motors in these lines to propel the vehicle forward. While operating in the forward direction, lines 84, 86 return fluid from the motors to their respective pumps. As may be seen, lines 80, 82 are also each connected to respective hydraulic cylinders 88, 90, available from Prince as model AU-0233. More specifically, line 80 is connected to the rod end 92 of cylinder 88, and line 82 is connected to the rod end 94 of cylinder 90. Respective reservoir return lines 96, 98 are connected from the piston ends 100, 102 of the cylinders 88, 90 to a reservoir 104. Each of a pair of check valves 106, 108 are connected between respective FORWARD lines 80, 82 and a FLUSH line 110 which has a flow restrictor 112 placed in series therewith. Flow restrictor preferably has a 0.014 diameter orifice therein for limiting the flow in line 110 to a low value, for example 16 ounces per minute (per side) at 300 psi. An electrically operable FLUSH valve 114 is connected in series between restrictor 112 and the reservoir 104. Valve 114 preferably has a pair of wires 116 connected to energize valve 114 (via solenoid 115) when the vehicle transmission is in a NEUTRAL condition. At that time, valve 114 will permit flow from restrictor 112 to reservoir 104, indicated by arrow 117. When the vehicle is out of the NEUTRAL condition, i.e., when it is in FORWARD or REVERSE, valve 114 will be driven by spring 118 to the position shown, providing a blocking check valve function 120 and stopping flow from restrictor 112 to reservoir 104. When fluid pressure is applied by the pump 68 to an associated motor 74 and cylinder 88, the motor 74 will rotate its associated wheel 24 and the hydraulic cylinder 88 will act against the associated suspension spring 42 to urge the respective wheel mount 32 towards the frame 14. When traction is reduced at the wheel 24, pressure will fall in its associated cylinder 88, allowing the associated suspension spring 42 to extend the respective wheel mount 32 away from the frame 14 to increase traction.

Comparing FIGS. 2 and 3, cylinder 46 corresponds to each of cylinders 88 and 90, with line 62 corresponding to lines 80 and 82. Line 64 corresponds to lines 96 and 98. It is to be understood that each wheel mount 32 has a spring 42 associated therewith. Spring 42 preferably has a spring constant of 1220 pounds per inch, a free length of 14.154 inches and a fully compressed length of 6.597 inches at a load of 9222 pounds. In a normal operating condition (i.e., with full tanks and a 180 pound operator), each front wheel assembly is designed to support 5000 pounds of vehicle weight.

Figure 5B:
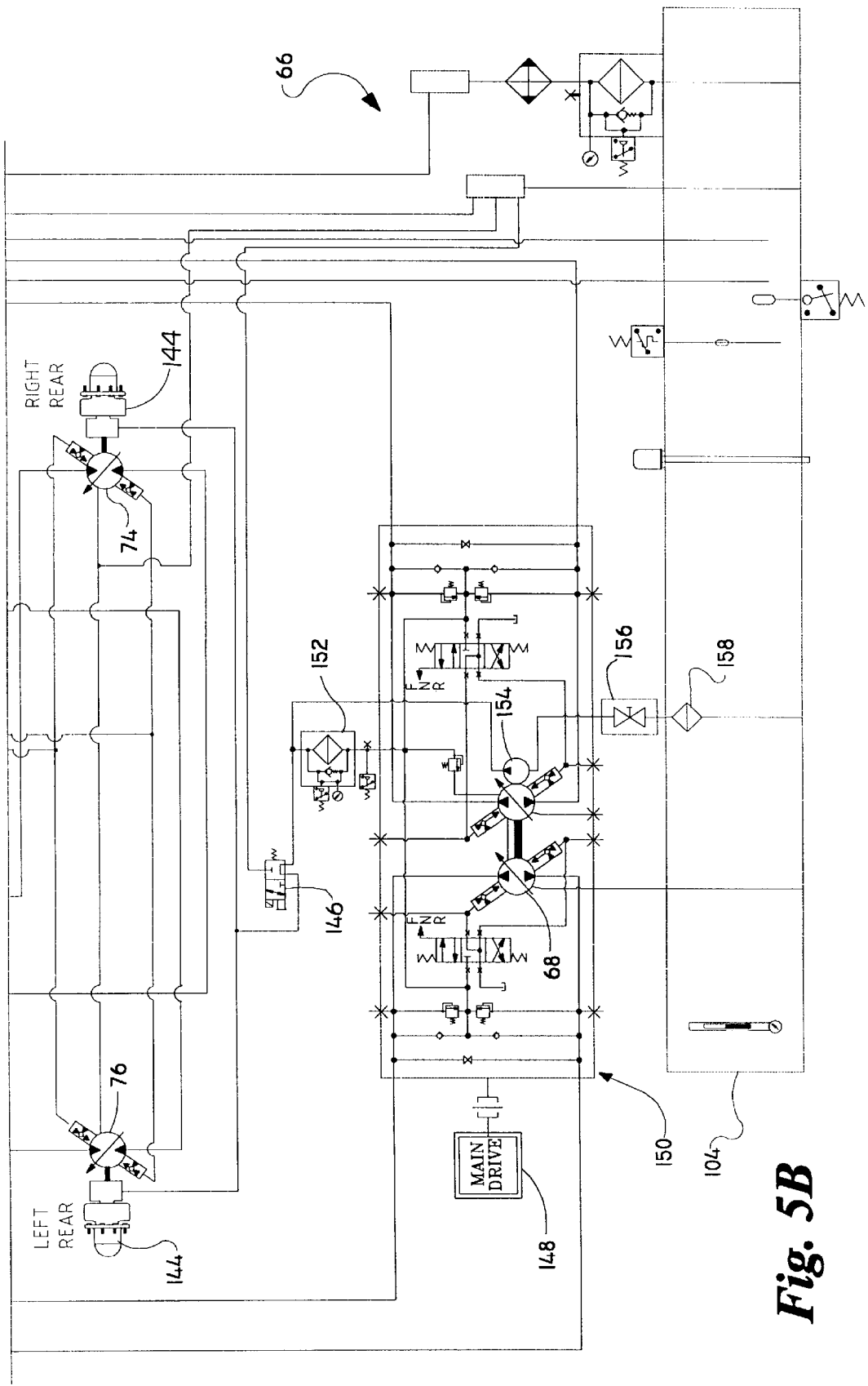
FIG. 5B is a second portion of the detailed hydraulic schematic of the hydraulic circuit of FIG. 3.

Referring now most particularly to FIGS. 5a and 5b, a detailed hydraulic schematic useful in the practice of the present invention may be seen. In addition to the parts shown in FIG. 4, the hydraulic circuit 66 has a SHIFT block assembly 122 (which, together with pump assembly 150 makes up a hydraulic transmission control which shifts the transmission into and out of NEUTRAL). The hydraulic circuit 66 further includes a pair of hot oil shuttle valves 124, 126, a pair of load sharing 0.070 diameter orifices 128, 130, a pair of shift valves 132, 134, a flush flow shuttle relief valve 136, and a pair of shift orifices of 0.020 diameter with integral filters 138, 140. Each front wheel preferably has a power wheel hub 142, as manufactured by Auburn with the designation MOD 7. Each rear wheel assembly has a power wheel hub with brake 144 by the same manufacturer under the same designation. A brake valve 146 is connected to each rear wheel hub 144 to control the brakes thereof. The main drive 148 (symbolically representing the diesel engine 18) powers a 46 series tandem hydrostatic pump assembly 150, available from Sundstrand as a model M46. A charge pump filter assembly 152 is coupled to the charge pump 154 of the tandem pump 150. Other conventional components may also be included, as necessary or desirable, such as a conventional gate valve 156 and strainer 158.

The operation of the present invention is as follows. In normal operation, the front suspension will be located at an intermediate position within a suspension operating range of 8 inches of travel between predetermined end points set by end stops 58, 60, with the specific position dependent upon vehicle weight which will vary primarily upon the volume of liquid in the tank 20 and the weight of the operator in cab 16. With an empty tank and no operator, the extension 38 of the wheel mount may be at 2 inches from end stop 58, for example. Loading the vehicle may move extension 38 to a position 4 inches from each of end stops 58, 60. The above positions are assuming forward motion of the vehicle, with a nominal 5000 psi pressure in the hydraulic lines 80 and 82. It is to be understood that the cylinders 88 and 90 will compress each suspension spring 42 by applying a nominal 2500 pound force thereon, since the effective rod end area of cylinders 88, 90 is 0.5 square inches.

In normal operation, the left front and right rear wheels corresponding to motors 72 and 74, respectively are powered in parallel by pump 68. Similarly, motors 76 and 78 are powered by pump 70, all as may be seen in FIG. 4. Thus is seen that diagonally opposite wheels share the same hydraulic propulsion circuit.

When traction is lost in either of the powered wheels in a given propulsion circuit, (for example, at motor 72 or 74, the pressure will drop at the rod end 92 of cylinder 88, releasing spring 42 at the left front wheel of the vehicle to move downward to reestablish traction, because the vehicle suspension will apply a downward, ground-engaging force to the left front and right rear wheels. Once traction is reestablished, the cylinder 88 will have hydraulic pressure reapplied to the rod end 92, and the spring will be recompressed in proportion to the hydraulic pressure in line 80.

It has been found desirable to flush the hydraulic cylinders 88 and 90 while the vehicle transmission is in neutral to prevent wear particles and other contaminants of the hydraulic cylinders from entering the hydraulic propulsion circuits. To that end, the electro-hydraulic flush valve 114 will provide a flow of hydraulic fluid from the cylinders 88 and 90 to the tank or reservoir 104, limited by orifice 112, when the transmission is in NEUTRAL. Check valves 106, 108 prevent inter-cylinder flow of hydraulic fluid, and check valve 120 prevents interference with traction control operation when the vehicle transmission is out of NEUTRAL. Alternatively, each of cylinders 88 and 90 may be designed to permit a controlled, small amount of leakage past their respective pistons, permitting flushing without requiring check valves 106, 108, restriction 112 or valve 114. In such an alternative arrangement, contaminants are carried out of cylinders 88 and 90 and delivered to reservoir 104 by return lines 96, 98.

Figure 5C:
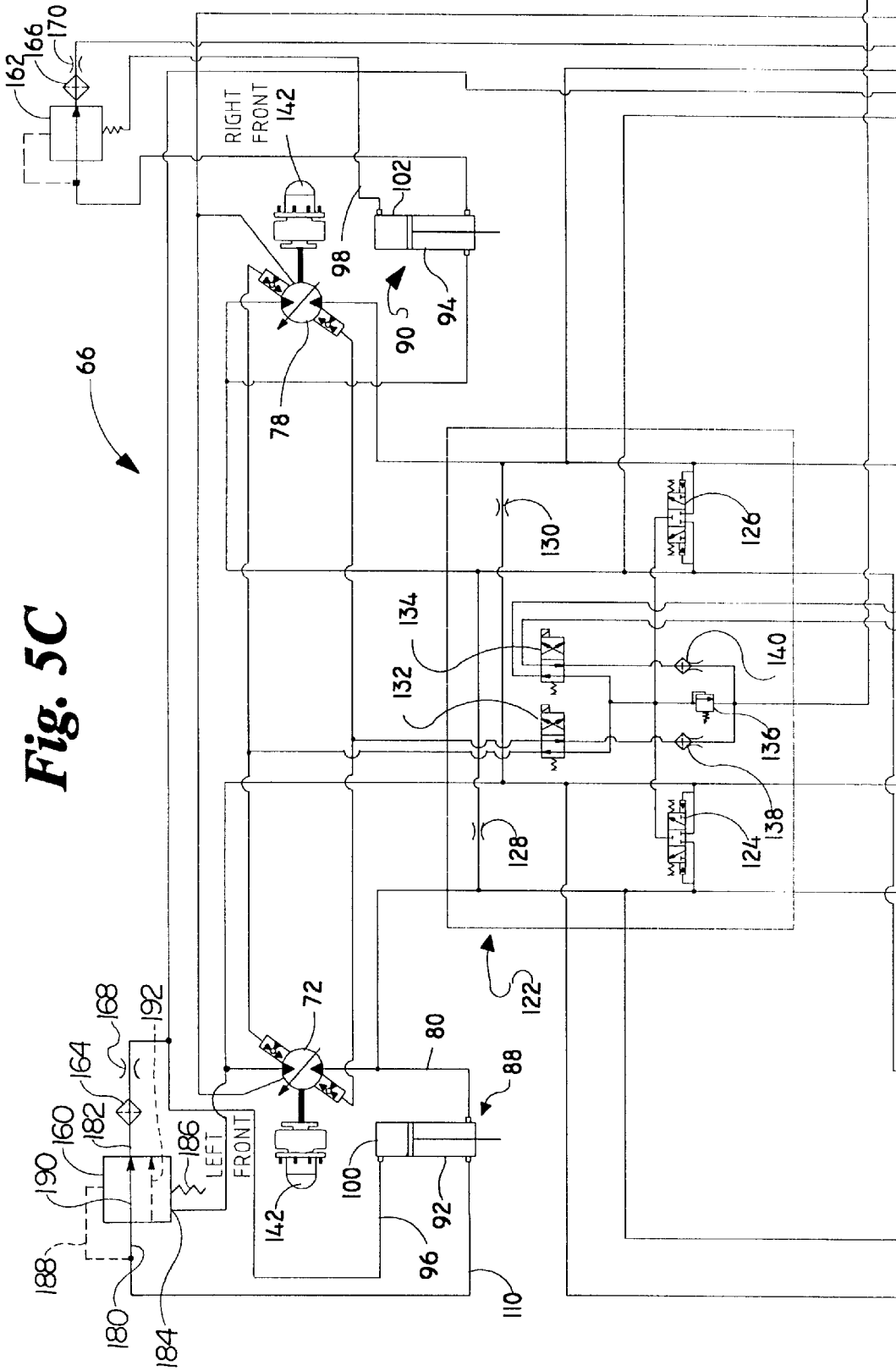
FIG. 5C is an alternative embodiment for the first portion shown in FIG. 5A, showing a different flushing subsystem for the fluid cylinders.

Referring now also to FIG. 5C, an alternative embodiment for flushing cylinders 88, 90 may be seen. It is to be understood that FIG. 5C represents a substitute for FIG. 5A and that either FIG. 5A or FIG. 5C can be combined with FIG. 5B. In the alternative shown in FIG. 5C, check valves 106 and 108 are omitted, as are flow restrictor 112, flush valve 114, along with solenoid 115, wires 116, and spring 118. Instead, a pair of diverter valves 160, 162 (Sterling Hydraulics Inc. model SK30504N-1, available from J. N. Fauver Co., Inc. at 10286 West 70th Street, Eden Prairie, Minn. 55344-3340) along with conventional strainers 164, 166 and conventional flow restrictors 168, 170 are connected to the respective hydraulic cylinders 88, 90. Flow restrictors 168 and 170 are each sized to permit about 8 ounces per minute flow at 300 psi.

Diverter valves 160, 162 are identical and their associated hydraulic circuitry functions in a similar manner; accordingly only one will be described in detail. Diverter valve 160 has a main input 180, an output 182, a pilot input 184 and a bias spring 186. In addition a secondary path 188 is connected from main input 180 to oppose the action of pilot input 184 and bias spring 186. With the engine running and the vehicle transmission in NEUTRAL, hydraulic flow from the charge pump 154 is delivered to wheel motors 72 and through the rod end of cylinder 88 via lines 80, 110. Line 110 is connected to the main input 180 of diverter or flush valve 160. Initially, the pressure of bias spring 186 holds valve 160 in the open position, indicated by the solid arrow 190. Hydraulic fluid from line 110 flows through valve 160, strainer 164 and flow restrictor 168, after which it is returned to the hydraulic fluid reservoir 104. Any contaminants entering the hydraulic fluid in the cylinder 88 will be flushed out and filtered in the reservoir 104. In this embodiment line 96 is connected to reservoir 104, for example, via the line receiving fluid flow downstream of restrictor 168.

With the transmission in FORWARD, pressure will rise in line 80 and 110, and the secondary path 188 will overcome the action of bias spring 186 and pilot input 184, causing valve 160 to close, indicated by the dashed arrow 192. It is to be understood that no flushing occurs during this mode of operation, to maximize the power available to the wheel motor 72.

When the vehicle (or more specifically, the transmission) is placed in REVERSE, the pressure in line 110 will drop (since line 80 will be on the downstream side of motor 72 in this mode of operation) and the action of spring 186 and the hydraulic pressure at pilot input 184 will urge the valve 160 to the open condition, represented by solid arrow 190. During this mode, system flushing will occur, as it does in NEUTRAL. Furthermore, it is to be understood that with an overhauling load, such as moving forward down a hill or grade, will reduce main and secondary path pressure and allow the valve 160 to open, permitting flushing then, as well as in NEUTRAL and REVERSE. Conversely, backing down a grade or hill will reverse the pressures, and close valve 160, stopping flushing during this circumstance, which typically will be rare.

It can thus be seen that the present invention encompasses a method of controlling traction in a land vehicle having a plurality of ground-engaging wheels with an individual fluid motor and suspension spring for each wheel of the vehicle. The method includes supporting wheel 24 on wheel mount 32 which is movable with respect to frame 14 of the vehicle 12, urging the wheel mount 32 away from the frame 14 using suspension spring 42, interposing a fluid cylinder 46 between the wheel mount 32 and the frame 14 and energizing the cylinder with a source of pressurized fluid applied to the fluid motor to urge the wheel mount 32 towards the frame 14 such that when ground-engaging traction is reduced at the wheel 24, pressure is reduced in the fluid and the cylinder 46 allows the spring 42 to move the wheel mount 32 away from the frame 14 to increase ground-engaging traction. The method also can include flushing the cylinder 46 when the vehicle is in NEUTRAL, in one embodiment, and in both NEUTRAL and REVERSE in another embodiment.

The method applies to a case where the vehicle has two front 72, 78 and two rear 74, 76 ground-engaging wheels with one front wheel 72 and one rear wheel 76 located generally on a first (e.g., left) side of the vehicle and the other front wheel 78 and rear wheel 74 located generally on a second (e.g., right) side of the vehicle and the source of pressurized fluid is fluidly coupled to the left front "one" wheel 72 (on the first side of the vehicle) and the right rear "other" wheel 74 (on the second side of the vehicle) and the fluid cylinder 88 is fluidly coupled to the "one" front and the "other" rear wheel and mechanically coupled to one of the "one" front wheel and the "other" rear wheel such that when traction is lost in one of the "one" front and the "other" rear wheels, the suspension spring 42 extends the wheel mount 32 to which it is attached to reestablish traction for the "one" front and the "other" rear wheels of the vehicle.

The invention is not to be taken as limited to all of the details thereof as modifications and variations thereof may be made without departing from the spirit or scope of the invention. For example, the hydraulic components of the present system may be replaced by appropriate pneumatic components while still remaining within the spirit and scope of the present invention. Furthermore, while the invention has been described with respect to an agricultural vehicle, it is to be understood that other land-based mobile applications of the traction control and active suspension are within the scope of the present invention.

It is to be further understood that the hydraulic cylinders 88, 90 may be flushed using various techniques in addition to what is shown in the drawings and described above. For example, it may be desirable to use a controlled leakage around the piston rings of the cylinders, or provide for a controlled leakage path through the piston or around the actual piston and cylinder rod. In such alternatives, it is preferred to have a flow of about 16 ounces per minute per side.

It is still further to be understood to be within the present invention to use system charge pressure to operate the system with a signal taken from the high pressure loop, even though it is contemplated that such an arrangement would require a larger cylinder with a slower reaction time. As a further alternative, another source (not shown) of hydraulic fluid at a higher pressure, such as a pressure compensating pump, can be used with a signal taken from the high pressure loop to control the respective cylinders 88, 90.

What is claimed is:

1. A traction control and active suspension apparatus for wheeled land vehicles of the type having an individual motor and spring for each wheel, the traction control and active suspension in combination therewith comprising:
   a) a vehicle frame;
   b) a hydraulic wheel motor mounted on a wheel mount movable with respect to the vehicle frame, the motor operative to rotate a wheel mounted thereon;
   c) a suspension member connected between the vehicle frame and the wheel mount and operative to urge the wheel mount away from the frame;
   d) a hydraulic cylinder mechanically connected between the vehicle frame and the wheel mount and hydraulically connected to the hydraulic wheel motor;
   e) a hydraulic pump hydraulically connected to the wheel motor and hydraulic cylinder such that when pressure is applied by the pump to the motor and cylinder, the motor will rotate the wheel and the hydraulic cylinder will act against the suspension member to urge the wheel mount towards the frame; and further such that when traction is reduced at the wheel, pressure will fall in the cylinder allowing the suspension member to extend the wheel mount away from the frame to increase traction.

2. The apparatus of claim 1 further comprising a hydraulic valve connected between the hydraulic cylinder and a hydraulic fluid reservoir and selectively operable to provide a hydraulic fluid path from the cylinder to the reservoir to permit selective flushing of the cylinder.

3. The apparatus of claim 2 further comprising a hydraulic transmission control having a neutral condition and wherein the hydraulic valve is operative to provide the fluid path from the cylinder to the reservoir when the transmission is in the neutral condition.

4. The apparatus of claim 2 wherein the valve is further operative to block the fluid path when the transmission is in a forward driving condition.

5. The apparatus of claim 2 further comprising a flow restriction connected in series with the cylinder and the valve to limit the flow rate of hydraulic fluid through the cylinder and valve.

6. The apparatus of claim 5 further comprising a check valve in a hydraulic line between the hydraulic cylinder and the hydraulic valve and operative to prevent flow of hydraulic fluid from the valve to the cylinder, while permitting flow from the cylinder to the valve.

7. The apparatus of claim 1 wherein the hydraulic wheel motor is mounted on the front of the vehicle.

8. The apparatus of claim 1 wherein the wheel mount is movable within a suspension operating range between predetermined end points and the hydraulic cylinder opposes the suspension member sufficient to position the wheel mount intermediate the end points of the suspension operating range under normal traction conditions.

9. The apparatus of claim 1 wherein the suspension member is a spring.

10. A method of operating an active suspension to control traction in a land vehicle of the type having a plurality of ground-engaging wheels with an individual fluid motor and suspension spring for each wheel of the vehicle, the method comprising the steps of:

a) supporting a wheel on a wheel mount movable with respect to a frame of the vehicle;

b) urging the wheel mount away from the frame using a suspension spring;

c) interposing a fluid cylinder between the wheel mount and the frame and fluidly connected to the fluid motor, and energizing the cylinder with a source of pressurized fluid applied to the fluid motor at substantially the same pressure so as to urge the wheel mount towards the frame such that when ground-engaging traction is reduced at the wheel, pressure is reduced in the fluid and the cylinder allows the spring to move the wheel mount away from the frame to increase ground-engaging traction.

11. The method of claim 10 further comprising the additional step of:

d) flushing the cylinder when the vehicle is in neutral.

12. The method of claim 11 wherein step d) further comprises flushing the cylinder when the vehicle is in reverse.

13. The method of claim 11 wherein step d) further comprises directing hydraulic fluid from the cylinder to a main input of a diverter valve, the diverter valve having a bias spring urging the diverter valve to an open position and a secondary path connected to the main input and operative to urge the valve to a closed position when the pressure rises at the main input to the diverter valve.

14. The method of claim 11 wherein step d) further comprises directing hydraulic fluid from a downstream side of the fluid motor to a pilot input on the diverter valve where the pilot input is operative to open the diverter valve when the pressure rises at the downstream side of the fluid motor.

15. The method of claim 10 wherein the vehicle has two front and two rear ground-engaging wheels with one front and one rear wheel located generally on a first side of the vehicle and the other front and rear wheels located generally on a second side of the vehicle and the source of pressurized fluid is fluidly coupled to the one front wheel on the first side of the vehicle and the other rear wheel on the second side of the vehicle and the fluid cylinder is fluidly coupled to the one front and the other rear wheel and mechanically coupled to one of the one front wheel and the other rear wheel such that when traction is lost in one of the one front and the other rear wheels, the fluid cylinder extends the wheel mount to which it is attached to reestablish traction for the one front and the other rear wheels of the vehicle.

16. The method of claim 15 wherein the cylinder is attached to the wheel mount carrying the one front wheel.

17. The method of claim 10 wherein the wheel mount is movable in a suspension operating range between a pair of predetermined end points and step c) further comprises positioning the wheel mount intermediate the end points of the suspension operating range when ground-engaging traction is present at the wheel.

* * * * *